Patented Sept. 17, 1940

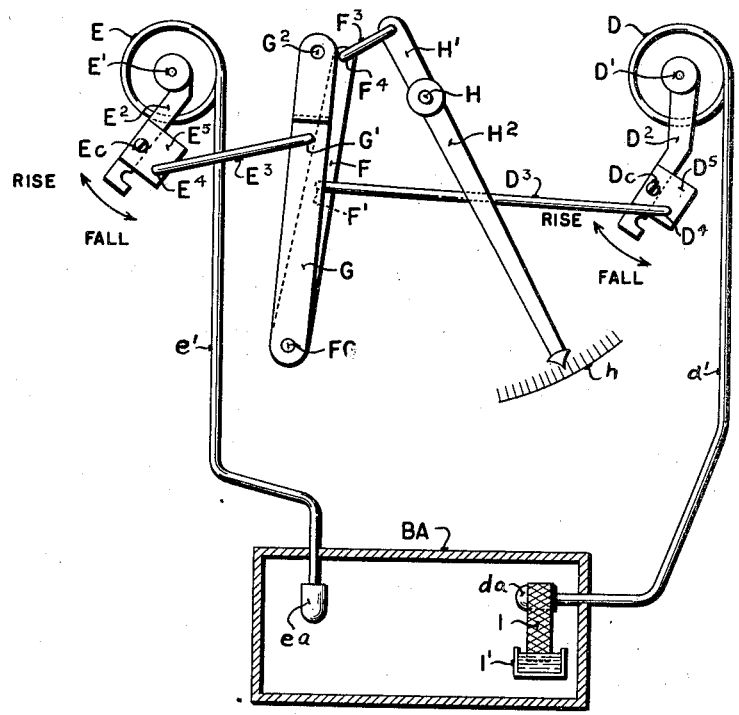

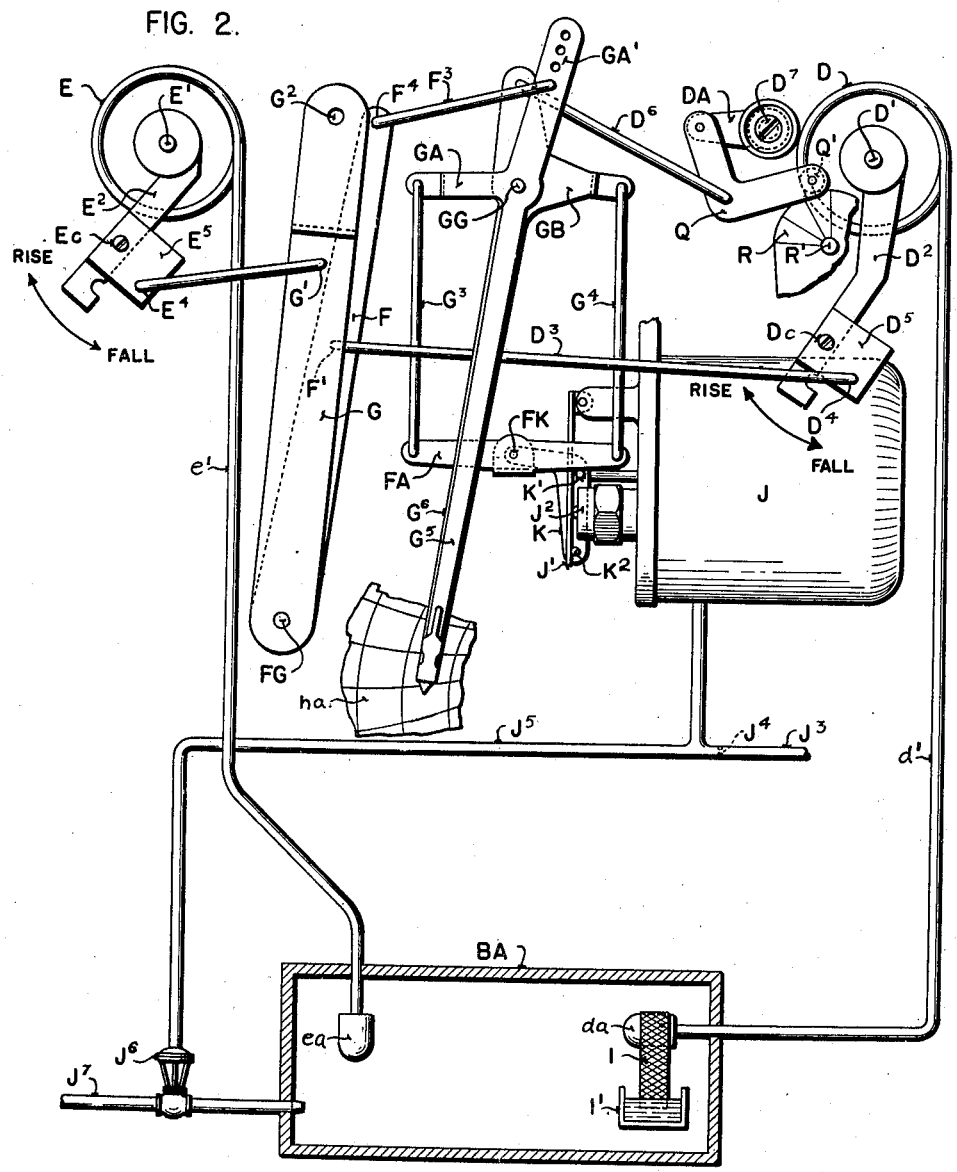

2,215,218

UNITED STATES PATENT OFFICE 2,215,218

MEASURING AND CONTROL APPARATUS

Thomas R. Harrison, Wyncote, Pa., assignor to The Brown Instrument Company, Philadelphia, Pa., a corporation of Pennsylvania Original application September 11, 1935, Serial No. 40,103. Divided and this application January 27, 1939, Serial No. 253,134

3 Claims. (Cl. 236—44)

The general object of the present invention is to provide improved mechanism primarily devised and adapted for use in and as a part of measuring and control apparatus which comprises means responsive to wet and dry bulb temperatures, and is adapted to measure, or to measure and produce a control effect, which is a function of the relative humidity indicated by those temperatures.

My invention is characterized by its mechanical simplicity, and, in particular, by lever and link arrangements employed with a resultant avoidance of lost motion and friction losses.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have diagrammatically illustrated and described various embodiments of my invention.

Of the drawings:

Fig. 1 is an elevation partly in section of essential parts of a humidity meter; and Fig. 2 is an elevation in section of essential parts of humidity control apparatus including features illustrated in Fig. 1.

In Fig. 1, I have diagrammatically illustrated a humidity meter for measuring the relative humidity in a space BA, in which are two thermometer bulbs $da$ and $ea$. Each of those two bulbs forms part of an expansible fluid thermometer. The two bulbs need differ from one another only as a result of the fact that the bulb $da$ forms part of a so-called wet bulb thermometer and is kept moist by suitable means. The conventionally illustrated means for that purpose comprise a wick I extending about the bulb and dipping into a water containing receptacle I'.

The bulb $da$ is connected by a capillary tube or pipe $d'$ to the stationary end of a Bourdon tube D, having its movable end connected, and giving angular movement, to an axial shaft $D'$ which carries an arm $D^2$. The bulb $ea$ is similarly connected by a tube or pipe $e'$ to the stationary end of a Bourdon tube E having its movable end connected to an axial shaft $E'$ carrying an arm $E^2$. The two shafts $D'$ and $E'$ are arranged side by side, and the arms $D^2$ and $E^2$ extend away from the same side of the plane including the axes of said shafts, and each arm turns clockwise as the temperature of the corresponding bulb $d$ or $e$ increases.

The arms $D^2$ and $E^2$ conjointly actuate means for exhibiting a function of the difference between the temperatures to which the bulbs $da$ and $ea$ are subjected. Those means comprise a floating lever F and a lever G having a fixed fulcrum pivot $G^2$, and carrying the fulcrum pivot FG for the lever F. The arm $D^2$ acts on the lever F through a link $D^3$, pivotally connected to the arm at $D^4$, and to the lever at $F'$. Similarly, arm $E^2$ acts on lever G through a link $E^3$ pivotally connected at $E^4$ to the arm $E^2$, and to the lever G at $G'$. At its end remote from its fulcrum pivot FG, the lever F is connected by a link $F^2$ to an arm $H'$ carried by a rock shaft H. The latter carries a pointer or pen arm $H^3$ cooperating with a scale, or scaled surface, $h$ to exhibit the changes in angular position of the arm H.

In the normal operating range, the movements of the fulcrum pin FG and point $F'$ are generally, or approximately, parallel. As shown, the fixed pivot $G^2$, which is parallel to, and slightly above the plane of the shafts $E'$ and $D'$, and the point $F^4$, at which the link $F^3$ is pivotally connected to the floating lever F, is also above that plane, and relatively close to the pivot $G^2$. As shown also, the distance between the fixed suspension pivot $G^2$ for the lever G, and the fulcrum pivot FG for the floating lever F, is appreciably greater than any of the lever arm lengths, $D'$—$D^4$, $F^4$—$F'$, $G^2$—$G'$, and $E'$—$E^4$.

In order that the position of the arm $H^2$ relative to scale $h$ may indicate the relative humidity of the atmosphere in the space B, the different parts of the lever and link arrangement through which the deflection of the arm $H^2$ is jointly controlled by the deflection of the arms $D^2$ and $E^2$, must be proportioned with reference to the well known psychrometric law that both the dry bulb temperature and the difference between the wet and dry bulb temperatures, must be taken into account in determining relative humidity from the measurements of those temperatures, and that with one of those temperatures fixed, the relative humidity change resulting from a given change in the other temperature, is greater when the fixed temperature is the dry bulb temperature than when it is the wet bulb temperature. To this end, the apparatus shown in Fig. 1 has its lever arms so relatively proportioned that a given dry bulb temperature will operate through the arm $E^2$ and lever G to give a smaller angular movement to the rock shaft H, than the same change in the wet bulb temperature would produce through the arm $D^2$ and floating lever F, except when the temperatures of the wet and dry bulbs are the same which will occur at 100% relative humidity. At 100% relative humidity points $G^2$ and $F^4$ will coincide. The deflection of the arm $H^2$ from the left hand or zero humidity end of the scale $h$ of Fig. 1, for a given difference between the wet and dry bulb temperatures, will thus be increased or decreased by a decrease or increase, respectively, in the temperature of the dry bulb $ea$, as is required by the above mentioned psychrometric law.

The apparatus shown in Fig. 2 comprises relative humidity measuring means, including levers F and G and adjusting provisions for those levers, which are identical with the levers F and G and actuating means therefor shown in Fig. 1. In Fig. 2, however, the link $F^3$ may not only actuate exhibiting means as in Fig. 1, but acts on a fluid pressure control unit or device J, through which the humidity in the space BA is regulated.

The control unit or device J produces control effects in accordance with the adjustment of its flapper or control valve $J'$. The unit J may take a wide variety of forms, and, as shown, is an air actuated controller of the type illustrated in Patent Nos. 2,124,946 and 2,125,109, each granted July 26, 1938, on a joint application of F. W. Side and myself. The movements of the lever F of Fig. 2 adjust the valve $J'$ through an operating means including a lever K which is pivoted to turn about a relatively stationary pivot axis $K'$, and has one arm connected to a floating lever FA, between the ends of the latter, by a pivot pin FK, and has a second arm carrying a pin $K^2$. The valve $J'$ is biased for movement into engagement with a nozzle $J^2$ of the device J to thereby prevent air flow outwardly from the unit through the bleeder orifice in said nozzle. As movements of the lever FA, effected as hereinafter described, give rising and falling movements to the pivot pin FK, the pin $K^2$ of the lever K moves the valve $J'$ away from, and permits it to move back toward the nozzle $J^2$.

The movements of the valve $J'$ toward and away from the nozzle $J^2$ increase and diminish the controlling air pressure within the device J, which receives air supplied under a suitably constant pressure by a pipe $J^3$ communicating with the pressure chamber of the unit J through a restricted orifice $J^4$. As shown in Fig. 2, the variable control pressure in the unit J is transmitted through a pipe $J^5$ to the pressure chamber of a motor pressure valve $J^6$, which is thereby actuated to variably throttle the supply of moisture through a pipe $J^7$ to the space BA, in accordance with the movements of the pivot pin FK.

As shown in Fig. 2, the lever FA is a substantially horizontal floating lever supported by suspension links $G^3$ and $G^4$, respectively, connected at their lower ends to the opposite ends of the lever FA. The upper end of the link $G^3$ is connected to a horizontally disposed arm of a bell crank lever GA, which is mounted on a pivot pin GG approximately midway between the links $G^3$ and $G^4$, and which has an uprising arm $GA'$ connected to the upper end of the lever F by a link $F^3$. As shown, the link $F^3$ may be arranged to act on the lever GA with different leverages by connecting it into one or another of a plurality of holes formed in the arm GA at different distances from the axis GG.

The upper end of the link $G^4$ is connected to the horizontally disposed arm of a bell crank lever GB also journalled on the pivot GG. The lever GB has an uprising arm connected by a link $D^6$ to means which determine the relative humidity which the apparatus is intended to maintain. Said mechanism which may be designated as a control point adjusting mechanism, comprises parts Q, DA and R. The link $D^6$ is directly connected to the part Q, which is a lever, intermediate the ends of the latter. One end of the lever Q is pivotally connected to a crank arm DA adapted to be angularly adjusted manually about an axis of a supporting pivot portion $D^7$, shown as provided with a kerf for engagement by a screw driver conveniently employed in angularly adjusting the device DA. Ordinarily, the device DA includes a friction washer or the like for holding the arm to which the link $D^6$ is attached in any angular position into which the arm may be adjusted.

The other end of the lever Q carries the supporting shaft for a roller $Q'$, which rides on an edge cam R carried by a constantly rotating timing shaft $R'$. As the rotation of the cam R varies the distance between the roller $Q'$ and the shaft $R'$, the lever GB is angularly adjusted to thereby vary the control point, or normal value of the control pressure maintained by the device J, in accordance with a program determined by the contour and rotative speed of the cam R. The manual adjustment of the device DA varies the said control point or normal value which the timing shaft $R'$ and cam R tends to maintain at any particular instant.

In Fig. 2, the control pressure transmitted through the pipe $J^5$ to the control valve $J^6$ regulates the supply of moisture to the chamber BA as required to maintain a predetermined relative humidity in the chamber BA, which is dependent upon, and is controlled by the above mentioned control point adjusting devices DA, Q, and R.

When the relative humidity in the space BA of Fig. 2 diminishes below the predetermined value, the control pressure to which the valve $J^6$ is subjected is decreased, thereby diminishing the throttling effect of the valve $J^6$ and increasing the supply of moisture through the pipe $J^7$ to the space, and restoring the relative humidity therein to its normal value. Converse actions occur when the relative humidity in the space BA increases above its normal value. The inclusion of the lever Q and timing or program cam R in the apparatus of Fig. 2, makes it possible to vary the relative humidity maintained at different hours of the day, or at different periods or stages in an industrial process, as may sometimes be desirable.

In each of the forms of the invention illustrated, the floating lever F produces an effect through means including a link $F^3$ pivotally connected to said lever at a point displaced both from the fulcrum axis of the lever and from the point at which the latter is connected to the means by which the floating lever is turned about said fulcrum axis, and the movements given the first mentioned actuating point are thus proportional, to the algebraic sum of the movements given the axis of the floating lever fulcrum, and the turning movements about that axis given to the floating lever. Whether or not exhibiting means be associated with the lever GA, of Fig. 2, the angular position of that lever varies with and provides a measure of the relative humidity in the space BA, exactly as does the angular position of the lever comprising the arms $H'$ and $H^2$ of Fig. 1. As shown, the lever GA has a pen arm extension $G^5$, adapted to record the relative humidity measured on a scaled travelling record surface $ha$, and the lever GB has an index arm extension $G^6$ which in conjunction with the surface $ha$, shows the relative humidity which the apparatus tends to maintain during the period indicated by the travel of the surface $ha$.

The invention is characterized in particular by the mechanical simplicity of the provisions for producing an effect which is proportional to the algebraic sum of two variable conditions or quantities, and is characterized, in particular, by the use of lever and link arrangements for producing that effect with a resultant reduction to a practical minimum, of the lost motion and friction losses inherent in apparatus comprising a plurality of coacting, relatively movable parts.

In apparatus of the form illustrated, provisions will ordinarily be desirable, as those skilled in the art will realize, for varying the distance between the shaft $E'$ and the point $E^4$, and between the shaft $D'$ and the point $D^4$, and such adjustment may be made as illustrated in Figs. 1 and 2, by manually moving member $D^5$ or $E^5$ along arm $D^2$ or $E^2$, respectively, toward and away from shafts $D'$ and $E'$, and clamping the member in its adjusted position by means of screw $Dc$ or $Ec$.

This application is a division of my Patent 2,193,095 issued March 12, 1940. In said patent, I have disclosed other specific embodiments of, and generically claim certain generic features of invention disclosed herein.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that, in some cases, certain features of my invention may be used to advantage without a corresponding use of other features.

Having now described my invention, what I claim as new and desire to secure by Letters Patent, is:

1. In apparatus for measuring relative humidity, the combination of wet bulb temperature measuring means, dry bulb temperature measuring means, a floating lever, a member pivoted to turn about an axis and providing a movable fulcrum for said lever, a connection between one of said means and said lever connected to the latter at a point thereof displaced from said fulcrum through which said point is moved in accordance with changes in the temperature measured by the means connected to said lever, means actuated by said lever in accordance with the movement of a point thereof displaced from said fulcrum, a connection between said member and the one of the two first mentioned means not connected to said lever by the first mentioned connection through which said member is moved in accordance with changes in the temperature measured by the last mentioned means to thereby give movements to said fulcrum in a direction generally parallel to the movements of the first mentioned point and of such magnitudes that the position of the second mentioned point will be jointly dependent upon the dry bulb temperature and the difference between the wet and dry bulb temperatures, said lever, member, and two connections forming a lever and link assembly substantially unbiased against relative movements of the parts thereof, effected by either of the two first mentioned means through the corresponding one of said two connections.

2. In apparatus for controlling relative humidity, the combination of wet bulb temperature measuring means, dry bulb temperature measuring means, a floating lever, a member pivoted to turn about an axis and provided with a movable fulcrum for said lever, a connection between one of said means and said lever connected to the latter at a point thereof displaced from said fulcrum through which said point is moved in accordance with changes in the temperature measured by the means connected to said lever, humidity varying means actuated by said lever in accordance with the movement of a point thereof displaced from said fulcrum, a connection between said member and the one of the two first mentioned means not connected to said lever by the first mentioned connection through which said member is moved in accordance with changes in the temperature measured by the last mentioned means to thereby give movements to said fulcrum in a direction generally parallel to the movements of the first mentioned point and of such magnitudes that the position of the second mentioned point will be jointly dependent upon the dry bulb temperature and the difference between the wet and dry bulb temperatures, said lever, member, and two connections forming a lever and link assembly substantially unbiased against relative movements of the parts thereof, effected by either of the two first mentioned means through the corresponding one of said two connections.

3. Apparatus as specified in claim 2 including program means for modifying the operative relation of said lever and humidity varying means and thereby varying the humidity maintained in a predetermined manner in the course of a humidity varying operation.

THOMAS R. HARRISON.